March 1, 1966     J. A. AILEO     3,237,202
VISOR DETENT DEVICE
Filed April 6, 1962     3 Sheets-Sheet 1
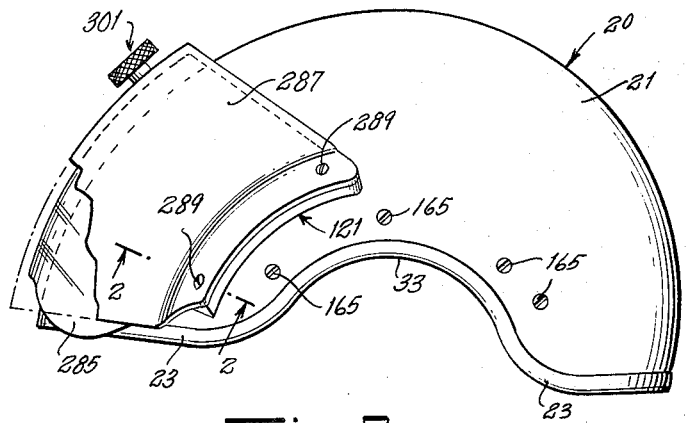
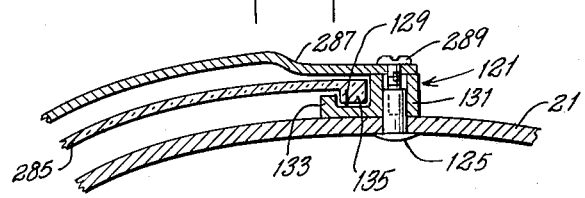
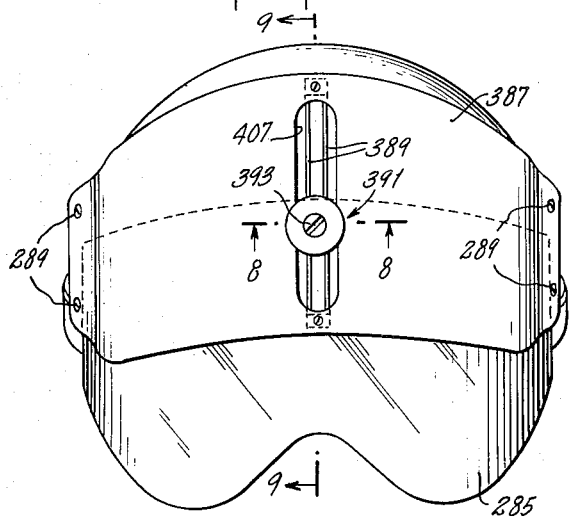
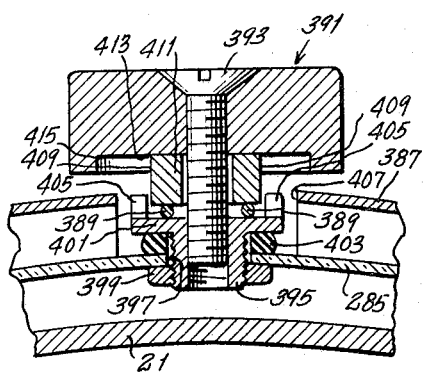
INVENTOR.
JACKSON A. AILEO
BY Lester W. Clark
ATTORNEY March 1, 1966  J. A. AILEO  3,237,202
VISOR DETENT DEVICE
Filed April 6, 1962  3 Sheets-Sheet 2
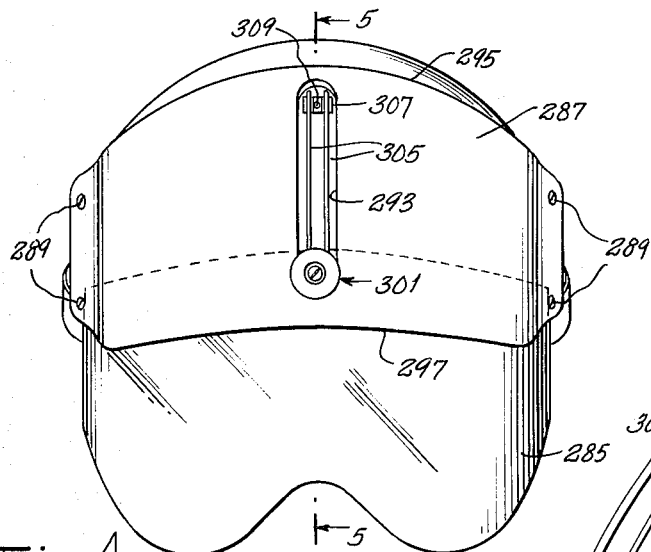
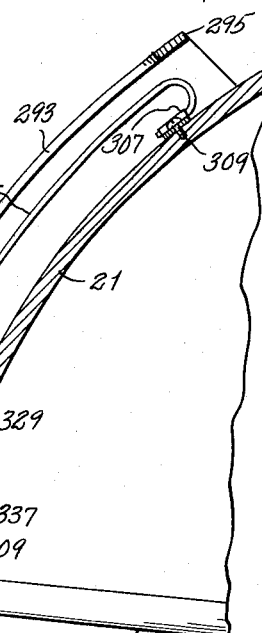
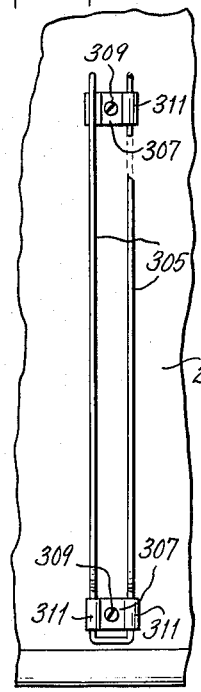
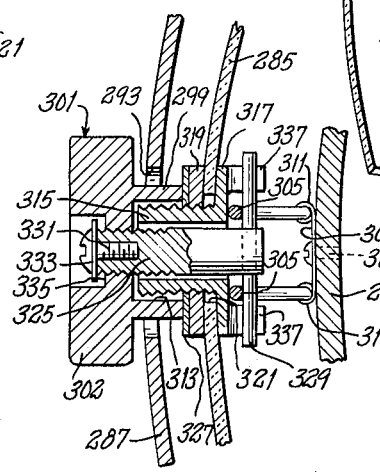
INVENTOR.
JACKSON A. AILEO
BY Lester W. Clark
ATTORNEY March 1, 1966 J. A. AILEO 3,237,202
VISOR DETENT DEVICE
Filed April 6, 1962 3 Sheets-Sheet 3
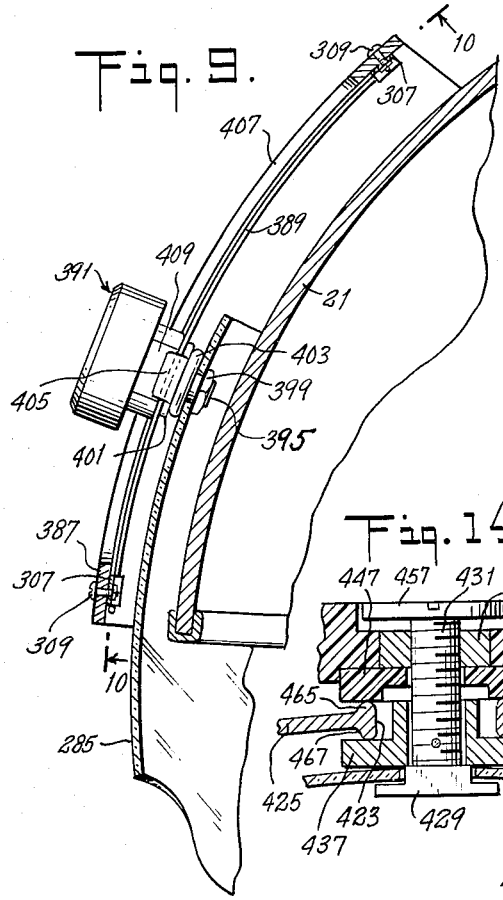
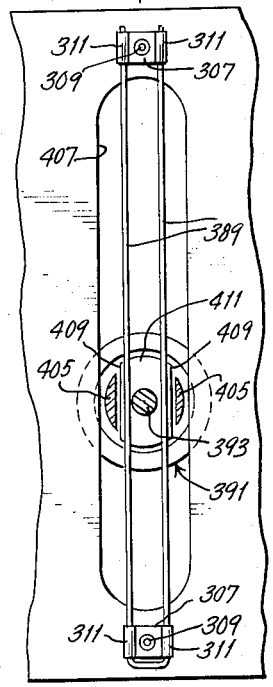
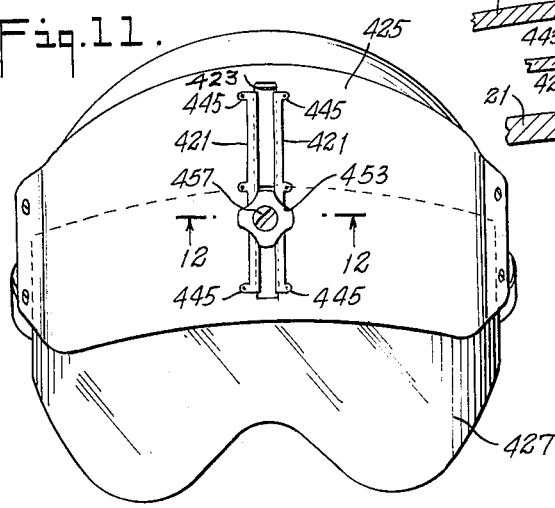
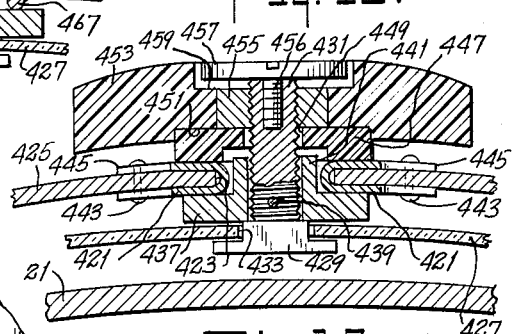
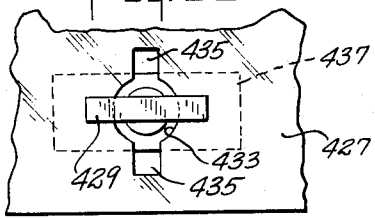
INVENTOR.
JACKSON A. AILEO
BY Lester W. Clark
ATTORNEY

United States Patent Office 3,237,202
Patented Mar. 1, 1966

3,237,202
VISOR DETENT DEVICE
Jackson A. Aileo, Carbondale, Pa., assignor to Leonard P. Frieder, Great Neck, Long Island, N.Y.
Filed Apr. 6, 1962, Ser. No. 185,702
4 Claims. (Cl. 2—6)

This application is a continuation-in-part of my application Serial No. 29,026, filed May 13, 1960, now Patent No. 3,190,973 issued June 22, 1965.

This invention relates to a protective helmet and more especially to a helmet providing a rigid outer shell for warding off blows and impact. The invention particularly relates to a helmet of this type provided with a visor movable between a retracted position and an eye shielding position and to means for holding the visor in a desired position.

In helmets of the above-mentioned type a rigging structure ordinarily is provided for supporting the weight of the helmet on the head of the wearer in such a manner that the shell of the helmet is disposed in spaced relation to and about the wearer's head to provide for absorbing the effect of the blow before it reaches the head. In such helmets the problem arises of reducing or cutting off the glare due to sun or other brilliant source of light and to this end the visor is supported for movement between a retracted position located above the wearer's face and eyes, which are exposed beneath the forward edge of the shell, and an eye shielding position where the visor covers a portion of the face or at least the eyes of the wearer.

Various devices have been proposed both for effecting movement of the visor and for holding it in a desired position relative to the shell. A problem which arises in connection with the support of such a visor is that in many cases, especially in aviation, high velocity of the wind or of movement through the atmosphere tends to lift the visor from the shell unless it is properly restrained. It has been proposed, therefore, to provide visor guiding means which may be a track with which the visor is engaged. In order to prevent or reduce the lifting or displacement of the visor, a cover disposed outwardly of the visor also has been securely supported upon the shell. This cover forms with the shell a space into which the visor is retracted and out from which at the lower open side thereof the visor is moved into eye shielding position.

In order conveniently to effect the movement of the visor, especially to effect such movement by one hand of the wearer and concomitantly securely to fasten the visor in a selected position, it has been proposed to provide the cover with a centrally disposed upwardly and downwardly extending slot through which extends a detent means which engages the visor, this detent means being engageable also with an elongated element or slideway extending along the slot so that, upon operation of a manually operable member of the detent means, the detent means engages the slideway to hold the visor in the selected position. It is desirable that the manually operable means shall be actuated by one hand of the wearer of the helmet to effect both engagement and release of the detent means, as well as to effect movement of the detent means and the visor in the desired position and refastening of the detent means to prevent accidental displacement of the visor from the selected position.

It is an object of the invention to provide a simple and improved detent means for a visor of a helmet of the type described.

It is a further object of the invention to provide an improved detent means which may easily be operated with simple motions of the fingers of one hand to effect release of the detent means and movement thereof and of the visor, and refastening in the desired position.

It is a still further object of the invention to provide a protective helmet carrying a visor with improved means supported on the helmet shell for guiding the movement of the visor and for holding the visor in a position to which it is moved.

It is an additional object of the invention to provide such a helmet construction having a visor and means supporting and guiding the visor with improved detent means which cooperates with a cover disposed outwardly of the visor and protecting the visor against lifting in the wind.

It is still another object of the invention to provide in a helmet construction utilizing a visor cover, this cover being provided with a centrally disposed slot, improved detent means having a member disposed outwardly of the cover and adapted to move the visor in the direction along the slot while being operable to effect holding of the visor in a desired position to which it is moved, as well as release for movement from this position.

The invention relates to a helmet having a shell, a visor movable between eye shielding and retracted positions, and especially in a helmet also having a cover outwardly disposed with respect to the shell, the visor being supported for movement into and out of the space between the cover and the shell, that an elongated element or a pair of elongated elements are disposed outwardly of the shell and extending upwardly and downwardly generally parallel to the movement of the visor. This movement may be along a slot in the cover which extends generally upwardly and downwardly, that is, in the direction parallel to the movement of the visor. It is a significant feature of the invention that, with such an elongated element or pair of elongated elements, detent means cooperates which extends through the slot and engages the visor within the space between the cover and the shell. This detent means is so constructed that a member which is outwardly disposed with respect to the cover, is rotatable on an axis transverse to the surface of the shell, this axis extending through the slot, preferably centrally thereof. The detent means is provided with a portion in the nature of a threaded stud and another portion in the nature of a nut threadedly engaging this stud, these portions being rotatable on the axis of the member one relative to the other. One or the other of these two portions is secured by suitable means to the visor so that, upon rotation of the manually operable member that is outwardly disposed with respect to the visor or to the cover, movement of one portion relative to the other toward and away from each other along the axis is effected. These two portions are so disposed relative to the elongated element or elements that clamping of this element or these elements is accomplished upon rotation of one portion relative to the other in the threaded relation mentioned. Not only is it possible to effect release of the detent means from the elongated element by rotating one portion relative to the other in a given direction but concomitantly with this rotational movement the detent means may be moved along the elongated element, and along the slot, to effect the movement of the visor to the desired position. The manually operable means may be continuously held by the fingers of one hand in such movements and, when the desired position is reached, the elongated element may be engaged by reverse rotation of one of the portions relative to the other to hold the detent means and the visor in the desired position.

Other objects and features of the invention in the several embodiments thereof will be understood more clearly from the description to follow, taken in connection with the drawings in which:

FIG. 1 shows in side elevation a helmet of the type to which the invention relates;

FIG. 2 is a section on line 2—2 of FIG. 1 showing the visor track means;

FIG. 3 shows a front elevation of the visor and cover therefor of the helmet of FIG. 1;

FIG. 4 is a detail showing to enlarged scale part of the detent means for the visor of the helmet of FIGS. 1 and 3;

FIG. 5 is a section on line 5—5 of FIG. 3;

FIG. 6 is a section on line 6—6 of FIG. 5;

FIG. 7 is a front view similar to FIG. 3 showing a modification of the invention;

FIG. 8 is a section on line 8—8 of FIG. 7;

FIG. 9 is a section on line 9—9 of FIG. 7;

FIG. 10 is a section along the arcuate line 10—10 of FIG. 9;

FIG. 11 shows a front elevation of the visor and cover similar to FIGS. 3 and 7 in a further modification of the invention;

FIG. 12 is a section on line 12—12 of FIG. 11;

FIG. 13 is a view upwardly in FIG. 12 showing the means provided for engaging and disengaging the detent means with and from the visor;

FIG. 14 shows in section a modification of the device of FIG. 12.

In FIG. 1 is shown a helmet 20 having a rigid shell 21 of suitable material and having an opening at the lower side thereof for receiving the head of the wearer and defined by an edge 23 disposed at a level somewhat above the eyes and above the nape of the neck of the wearer. The shell is supported in this position on the head of the wearer by rigging and head band means such as are disclosed in my copending application Serial No. 29,026, filed May 13, 1960, of which this present application is a continuation-in-part. The edge 23 of the shell extends about a bay 33 formed in the shell to accommodate ear cups which may be suspended by means (not shown) secured thereto and secured to the shell 21 by screws 165. The shell carries visor 285 supported on track means 121 shown in section in FIG. 2. Other features of the helmet and its shell and the devices supported thereby are disclosed in said copending application which do not form a part of the present invention.

As shown in FIGS. 1, 2, 3 and 5 the visor 285 is supported for movement between eye shielding position of FIGS. 3 and 5 and the retracted position of FIG. 1 by track member 121 secured to the shell 21 by screws 289 passing through the track member 121 and threaded into nuts 125 engaging the inner surface of the shell. The heads of the screws 289 bear on the outer exterior surface of the edge portions of a cover 287 which is supported in outwardly spaced relation to the shell and outwardly of the visor 285.

The visor adjacent its lateral edges is formed with a slide element 135 which fits for free sliding movement in the groove 129 of the track member 121. This groove is formed between the body portion 131 of the track member 121 and a rib 133 extending lengthwise along the groove, that is, generally parallel to the direction of movement of the visor.

In FIGS. 3 to 6, inclusive is shown a novel construction for support of a visor on the helmet and detent means for this visor which provides for movement of the visor between eye shielding and retracted positions thereof as well as for holding the visor in desired positions between these two extreme positions. The track means which supports the visor 285, as shown in FIG. 1, also supports the cover 287 secured to this track means by the screws 289 above mentioned which pass through holes in the cover and in the body portion 131 of the track member 121 and through holes in the shell 21 into engagement with nuts 125. The edge portions of the visor 285 which engage in sliding relation the groove 129 are engaged by the overlapping edge portions of the cover to prevent lifting of the slide element 135 from the groove 129 of the track member 121. The cover 287, however, extends from the track member 121 at one side of the helmet over the forward portion thereof and over the visor 285 to the track member 121 at the opposite side of the helmet.

In the embodiment of FIGS. 3 to 6, inclusive, the cover 287 has formed therein a slot 293 disposed upon the center line of the helmet and of the cover between the track members 121. This slot 293 extends from an end adjacent the upper edge 295 of the cover 287 to an end adjacent the lower edge 297 of the cover to provide for disposition in this slot of the shank 299 of a member 301 for manual operation of a detent means to be described further. The member 301 may be moved manually along the slot between the two ends thereof and is connected to the visor 285 by the parts of the detent means to be described so as to effect movement of the visor correspondingly between the eye shielding position shown in FIGS. 3 and 5 and the retracted position in which the member 301 is disposed adjacent the upper end of the slot 293 and the visor is disposed under the cover 287, as in FIG. 1. Engagement of the shank 299 of the member 301 with the respective ends of the slot determines the limits of the movements of the visor 285.

For the purpose of holding the visor in any position between and including the eye shielding and retracted positions thereof, detent means is provided which includes a pair of elongated elements 305 which may be wires of relatively small cross section but of material such that they will be fairly stiff and will retain their form, as shown in FIGS. 4, 5 and 6 in which the upper ends are bent and reverted so as to be engaged by a bracket 307 secured by screw 309 to the shell 21 of the helmet. As shown in FIG. 4 the bracket 307 is formed so as to span across and engage both wires 305 for this purpose at the reverted upper ends of the wires that are adjacent the helmet shell 21. At the lower ends of the wires 305 they are offset to provide portions which also are engaged by a similar bracket 307 secured by screw 309 to the shell 21. Thus, the main arcuate extents of the wires 305 are disposed in outwardly spaced generally parallel relation to the outer surface of the shell 21 and in transversely spaced relation to each other. As shown in FIG. 6 engagement of the brackets 307 with the wires on either side of the screw 309 is accomplished by end portions 311 of the bracket looped about the reverted ends or about the offset portions of the wires 305, the screw 309 extending through the planar intermediate portion of the bracket into the shell 21. The main arcuate extent of the wires 305 is disposed adjacent but somewhat spaced inwardly from the inner surface of the arcuate extent of the visor 285. By means of a device about to be described which is secured to the visor, the visor may be held in any desired position between and including its extreme positions by clamping action brought upon the arcuate extents of the wires 305.

To this end, as shown in FIG. 6, within the shank 299 of the manually operable member 301 which extends through the slot 293 is provided a recess 313 extending from the inner end of shank 299 toward the enlarged head portion 302 of the member 301. Within the recess 313 is disposed the externally threaded hub of a counter member 315 having at its end disposed toward the shell 21 a flange 317. Threaded upon the threaded portion of the counter member 315 is a nut 319 which engages the outer face of the visor 285, the flange 317 engaging the inner face of this visor. The threaded portion of the member 315 extends through a hole 321 in the visor and the flange 317 and the nut 319 serve to clamp the counter member 315 to the visor 285.

The counter member 315 is provided with a bore the axis of which extends transverse to the visor and to the shell 21. Within this bore for axial movement relative to the counter member is disposed a stud 325 which is threaded at its outer portion, the threads engaging a threaded hole in the enlarged head portion 302 of the member 301. When the stud 325 is held against rotation, rotation of the head 302 in a given direction will move this head and the shank 299 along the axis of the stud, so as to bring the inner end of the shank 299 against a washer 327 carried upon the counter member 315 in face to face relation with the nut 319. Since the nut 319 is held against rotation on the counter member 315, being clamped to the visor and the flange 317, rotation of the head 302, after engagement of the end of the shank 299 with the washer 327 will effect movement of the stud toward the left in FIG. 6. Opposite rotation of the head 302 will effect movement of the stud toward the right. For reasons about to be explained only slight or fractional rotation of the head 302 is necessary to effect the requisite movement of the stud toward the left or toward the right to produce the bearing of the shank 299 against the washer 327 or release therefrom.

As shown in FIG. 6, at the right hand end of the stud is disposed a pin 329 extending through a hole in the stud 325 transversely of its axis. The pin 329 is disposed adjacent the arcuate portion of the wires 305 and between these portions and the shell 21, so that left hand axial movement of the stud 325 draws the pin 329 against both of the wires 305. As the right hand face of the flange 317 also is disposed adjacent the wires 305 but on the opposite side thereof from the pin 329, movement of the stud 325 toward the left relative to the member 315 effects clamping of the wires 305 between the flange and the pin. Only slight separation of the pin from the flange by movement of the stud toward the right is necessary to release these parts from the wires 305. On the other hand, only slight movement of the stud 325 toward the left relative to the member 315 is required to effect a strong clamping action on the wires 305. In view of the threaded relation of the stud 325 to the head 302 only slight rotation of the head 302 is required to effect corresponding movements for clamping and unclamping the wires 305.

To prevent inadvertent unscrewing of the head 302 from the threaded stud 325, screw 331 threaded in the end of stud 325 and washer 333 are provided for engagement with a shoulder 335 formed at the right hand end of a recess in the head 302. It will be understood that slight rotation of the head 302 in one direction, ordinarily counter-clockwise when viewed from the left in FIG. 6, will effect unclamping action so that the member 301 may be moved along the slot 293 to a different position corresponding to a different desired position of the visor 285. By clockwise movement of the head 302 on the stud 325, clamping action in the desired position may be effected. In order to prevent rotation of the stud 325 on its axis in these rotational movements of the head 302, the member 315 also is provided with lugs 337 extending toward the right in FIG. 6 from the flange 317, the pin 329 being disposed in the space between these lugs, as may be seen in FIG. 5. This space is of sufficient width and axial length so that the axial movements described of the stud 325 and the pin 329 with respect to the wires 305 may be accomplished without undue frictional or other interfering engagement of the pin with the lugs 337.

It will be recognized that the detent means shown and described in connection with FIGS. 3 to 6, inclusive, which includes the wires 305, provides a structure which is of light weight while being strong and of sufficient rigidity to secure the visor 285 in any desired position and without requiring that the cover 287 shall serve as a support and to provide for the reactions of the detent means. The cover in the embodiment of FIGS. 3 to 6 may be of such form and rigidity merely to serve to cover the visor and to limit or prevent wind action thereon. By virtue of the detent means described, the forces required for holding the visor in the desired position, however, are brought upon the parallel wires and then directly upon the helmet shell.

In the embodiment of FIGS. 7 to 10, inclusive, however, the parallel wires for engagement by the detent means are supported upon the cover inwardly thereof and outwardly of the visor. In this embodiment the cover 387 may be supported on visor track means, similar to that shown in FIG. 2, and may be secured at the edge portions of the cover by screws 289 as shown in FIG. 2. The cover 387, if desired, may have a thickness somewhat greater than that of the cover 287 of FIGS. 3 and 5, or may be made of such material as to provide the requisite rigidity, having regard to the arcuate form thereof, so that the wires 389 may be supported securely on the cover by means of brackets 307 secured by screws 309, FIGS. 9 and 10, similar to those shown in the embodiments of FIGS. 3 to 6, inclusive. The wires may be of arcuate form generally paralleling the arc of the cover 387 and disposed generally parallel to the exterior surface of the helmet shell 21. In this embodiment, as the wires supported by the cover 387 are disposed in outwardly spaced relation to the outer surface of the shell 21 and outwardly of the visor 285, the visor may move into and out of the space between the cover 387 and the shell 21 without interference by the wires.

In this embodiment, in order to provide for holding the visor in any desired position, the detent means comprises an outwardly disposed manually operable member 391 in which is secured a flat headed screw 393. The screw 393 may be secured by molding the member 391 about the screw adjacent the head thereof. The opposite end of the screw 393 is rotatably threaded in a counter member 395 which extends downwardly in FIG. 8 through an opening 397 in the visor 285. The lower end of the counter member 395 has threaded thereon a nut 399 at the inner side of the visor 285. The counter member 395 has a flange 401 extending transverse to the axis of the screw 393. Between the flange 401 and the outer face of the visor 285 a spacer 403 of suitable thickness and material is disposed so as to provide a washer for clamping action of the nut 399 and the flange 401 upon the visor 285. The thicknesses of the flange 401 and of the spacer 403 are such that the upper surface of the flange in FIG. 8 is adjacent the two wires 389 at the under side thereof. Upstanding from the flange 401 are lugs 405 which are disposed laterally outwardly with respect to the two wires 389, FIGS. 8 and 9, and serve to guide the detent device along these wires and, therefore, to guide the visor 285 generally in the upward and downward direction.

As in the embodiment of FIGS. 3 to 6, inclusive, the cover 387 is provided with a slot 407 extending upwardly and downwardly and of sufficient width for the lugs 405 to clear the edges of the slot while being disposed therein, as shown in FIGS. 8 and 10. These lugs also serve to engage the flat parallel surfaces 409 of a bushing 411 which is provided with a central hole through which the screw 393 extends. The upper transverse surface of the bushing 411 engages the bottom surface 413 of the member 391. This bottom surface may be the surface of a recess 415 open downwardly in FIG. 8. As the screw 393 is fixed in the manually operable member 391 and is rotatable therewith on the axis of the screw with the threads of the screw 393 engaging the threads in the counter member 395, upon rotation of the member 391 in a given direction, the counter member 395 will be drawn upwardly in FIG. 8 toward the wires 389 while the bushing 411 will be forced downwardly into engagement with the upper side of these wires. Thus, the detent means will be clamped in the manner similar to that described in connection with FIGS. 3 to 6, inclusive. The visor may be disposed in any position along the slot 407, it being possible to effect the clamping and unclamping of the detent means of FIGS. 7 to 10, inclusive upon the wires, as well as movement of the detent means and the visor therewith along the wires, by the fingers of one hand.

In the embodiments of FIGS. 11, 12 and 13, instead of clamping on a pair of wires constituting elongated elements which cooperate with the detent means, these elongated elements are provided by metal strips 421 which extend along and about the edge portions of the slot 423 formed in the cover 425 disposed outwardly of the visor 427 and outwardly of the shell 21, FIG. 12. Adjacent the inner side of the visor 427 is disposed a flanged member 429 of the detent means which is rigidly secured to a threaded stud 431, this stud extending upwardly in FIG. 12 through the slot 423, that is, through the elongated space between the rounded portions of the metal strips 421. As shown in FIG. 12 the end portions of the flange 429 lap upon the visor adjacent an opening 433 therein. The opening 433 may be circular about the axis of the stud 431 but there also may be provided portions of a rectangular slot 435 in the visor extending lengthwise of the slot 423 which make it possible to turn the visor on the axis of the stud to the position where the portions of slot 435 coincide with the flange 429, so that the flange may be passed through the rectangular slot of the visor to effect mounting and demounting of this visor on the detent means.

Between the visor 427 and the under side of the metal strips 421 is disposed a flanged counter member 437 which is pinned by pin 439 to the stud 431. This counter member 437 may have a hub portion 441 extending upwardly between the metal strips 421 and serving to guide the detent means along the slot by engagement of the peripheral surface of the hub 441 with the rounded portions of the metal strips 421. As shown in FIG. 12 the spacing of the flange of the counter member 437 from the flange 429 is such that the visor 427 may be turned, as mentioned above, for mounting and demounting but will be held in place between the flange 429 and the counter member 437 when turned to its operating position and held in this position by virtue of track engaging elements carried by the visor track means mounted on the shell similar to that described in connection with FIGS. 1 and 2. The metal strips 421 may be held in place by rivets 443 passing through ears 445 formed on the metal strips 421 and through the cover 425.

Outwardly of the cover 425 and the metal strips 421 is disposed a member 447 for engaging the metal strips as slideways and cooperating with the flange of the counter member 437 to clamp the detent means on the slideways. The member 447 may have a recess open downwardly for clearance with respect to the end of the hub 441. This clamping member 447 has a hole 449 therein through which the stud 431 extends. The upper surface of the clamping member 447 engages the surface 451 of a recess at the under side of a manually operable member 453 which is rotatable relative to the clamping member 447 upon the axis of the stud 431. Embedded in this manually operable member 453 and in threaded relation to the stud 431 is a nut 455 which may be of hexagonal shape so as to engage the member 453 to prevent rotation of one with respect to the other. The manually operable member 453 may be of plastic molded about the nut 455 to secure such engagement. It will be apparent, upon rotation of the member 453 and of the nut 455 therewith on the threads of the stud 431 in a given direction, that the clamping member 447 will be moved toward the counter member 437 and the clamping member and the counter member will engage the respective outer and inner surfaces of the metal strips 421, thereby to securely clamp the detent means in position upon the cover 425 to determine the position of the visor. Upon reverse rotation of the manually operable member 453, unclamping is effected and the detent means, together with the visor may be moved along the metal bound slot 423 to any other desired position within the length of the slot.

To prevent excessive unscrewing movement of the manually operable member 453 upon the threads of the stud 431, a screw 456 which may have left-hand threads is threaded in the upper end of the stud 431 and is provided with a relatively large head 457 disposed in a recess 459 in the upper side of the manually operable member 453. This screw 456 and its head 457 thus limit the turning movement of the manually operable member 453, but only a fractional rotation of the member 453 and the nut 455 is required in order to move the members 437 and 447 of the detent clamping means from clamping position to unclamping position, or the reverse. When the screw 455 is removed it is possible fully to turn off the manually operable member 453 from the stud 431 and then to remove the clamping member 447 upwardly in FIG. 12 in the operation of demounting the detent means. It then is possible, having removed the visor by turning movement as above described, to turn the flange 437 of the counter member to a position at right angles to that shown in dotted outline in FIG. 13, together with the flanged member 429 and stud 431, so that the counter member and the flanged member and the stud may be moved upwardly through the space between the metal strips 421.

FIG. 14 shows in section similar to that of FIG. 12 a modification of the device for clamping on the elongated elements disposed along the edges of the slot 423. In FIG. 14, instead of the metal strips 421 which extend about and bind the edge of the slot and serve as slideways, the cover 425 is molded or otherwise formed with upper and lower beads 465, 467 which may cooperate respectively with the clamping member 447 and with the flange of the counter member 437. The clamping member 447 and the counter member 437 cooperate with a stud 431 and a nut 455 secured in the manually operable member 453 in the same manner as described in connection with FIG. 12, other parts not shown in FIG. 14 being the same as those shown in and described in connection with FIG. 12. It will be apparent that the same advantages with respect to easy clamping and unclamping and easy movement of the detent means along the elongated element to move the visor between retracted and eye shielding position are secured in the embodiment of FIG. 14 as in the other embodiments described.

It will be understood, in the several embodiments which have been described, that the clamping engagement of elongated elements disposed along the slot, whether these be wires or the metal strips binding the edges of the slot in the cover or the beads on the cover, is accomplished by rotation of a threaded stud and a nut one relative to the other and that one or the other of these members of the detent means is operatively connected to a manually operable member so that the rotation of either the nut or the stud may be effected by the fingers of one hand of the wearer of the helmet which also, without further effort to manipulate the detent means, may move the detent means and therefore the visor along the slot, that is, along the slideway provided by the elongated elements.

Within the scope of the invention variations may be made in the form of the several parts of the detent means as well as in the elongated elements which cooperate with the detent means. Variations also may be made in the materials utilized for the detent means and for the visor and cover while providing for the functions of these parts as have been described when supported on a rigid helmet. All such variations which embody the essential concept of the invention as disclosed herein are intended to come within the scope of the appended claims.

I claim:
1. A helmet, comprising:
   (a) a shell adapted to receive the head of a wearer;
   (b) a visor supported on the shell for movement along a path extending between an eye shielding position and a retracted position above the forward portion of the shell;
   (c) a cover fixed on the shell and cooperating with the shell to define a recess sufficiently large to receive the visor in its retracted position with substantial clearance between the visor and the cover and also between the visor and the shell, said cover having an elongated central fore-and-aft slot as long as and parallel to said path;

(d) an elongated grippable element fixed in a position adjacent the slot and spaced from said visor and extending substantially the full length of the slot; and (e) a manually operable visor position adjusting assembly extending from the visor outwardly through the slot in the cover, said assembly comprising:
 (1) two cooperating threaded members relatively rotatable about an axis extending through the slot;
 (2) means spaced from the cover and connecting only one of the threaded members to the visor for concurrent movement therewith, said connecting means holding said one member against substantial rotation with respect to said visor while the other member may rotate with respect to the one member and the visor;
 (3) the other of said members having a manually graspable portion at the outer end of said assembly to facilitate rotation of said other member; and
 (4) two clamp members spaced along said axis on opposite sides of said grippable element and operable into and out of gripping engagement with said element by relative rotation of said threaded members while the visor remains fixed to the one threaded member during said relative rotation, whereby said visor may be moved to and held in any selected position along its path by translation and rotation of said other threaded member.

2. A helmet as defined in claim 1, in which one of said clamp members is fixed to said one threaded member for concurrent movement therewith.

3. A helmet as defined in claim 1:
 (a) in which said elongated grippable element is a stiff wire; said helmet further including:
 (b) means supporting said wire at its ends so that it extends between and spaced from the cover and the shell and in a position accessible through said slot.

4. A helmet as defined in claim 1, in which said grippable element is one of a pair of similar grippable elements located on opposite sides of and parallel to the center line of the slot, both said grippable elements being engaged by said clamp members upon operation thereof into gripping engagement.

References Cited by the Examiner
UNITED STATES PATENTS

| | | | |
|---|---|---|---|
| 787,088 | 4/1905 | Earhart | 151—16 |
| 1,096,070 | 5/1914 | Stull | 151—16 |
| 1,138,574 | 5/1915 | King et al. | 151—16 |
| 1,210,595 | 1/1917 | Brubaker | 85—9 |
| 2,272,833 | 2/1942 | Dockson | 2—8 |
| 2,301,050 | 11/1942 | Kelley | 2—10 |
| 2,445,355 | 7/1948 | Hurt | 2—10 |
| 2,465,548 | 3/1949 | Michael | 151—68 |
| 2,758,307 | 8/1956 | Treiber | 2—9 |
| 2,798,221 | 7/1957 | Bailey et al. | 2—6 |
| 3,060,444 | 10/1962 | Hoffmaster et al. | 2—8 |
| 3,074,519 | 1/1963 | Soeder | 85—9 |
| 3,117,322 | 1/1964 | Goldman | 2—6 |

JORDAN FRANKLIN, *Primary Examiner.*

THOMAS J. HICKEY, *Examiner.*

J. R. BOLER, *Assistant Examiner.*